(12) United States Patent
Castro et al.

(10) Patent No.: US 11,417,907 B2
(45) Date of Patent: Aug. 16, 2022

(54) COMPOSITE POLYMER ELECTROLYTE (CPE) MEMBRANES FOR SECONDARY SOLID STATE LI-METAL CELLS AND PROCESS FOR THE PRODUCTION THEREOF

(71) Applicant: TOYOTA MOTOR EUROPE, Brussels (BE)

(72) Inventors: Laurent Castro, Brussels (BE); Fanny Barde, Brussels (BE); Jijeesh Ravi Nair, Turin (IT); Marisa Falco, Turin (IT); Federico Bella, Turin (IT); Claudio Gerbaldi, Turin (IT)

(73) Assignee: TOYOTA MOTOR EUROPE, Brussels (BE)

( * ) Notice: Subject to any disclaimer, the term of this patent is extended or adjusted under 35 U.S.C. 154(b) by 305 days.

(21) Appl. No.: 16/647,085

(22) PCT Filed: Sep. 14, 2017

(86) PCT No.: PCT/EP2017/073163
§ 371 (c)(1),
(2) Date: Mar. 13, 2020

(87) PCT Pub. No.: WO2019/052648
PCT Pub. Date: Mar. 21, 2019

(65) Prior Publication Data
US 2020/0266478 A1    Aug. 20, 2020

(51) Int. Cl.
*H01M 10/056*    (2010.01)
*H01M 10/052*    (2010.01)
(Continued)

(52) U.S. Cl.
CPC ....... *H01M 10/056* (2013.01); *H01M 10/052* (2013.01); *H01M 10/0562* (2013.01);
(Continued)

(58) Field of Classification Search
CPC ............. H01M 10/052; H01M 10/056; H01M 10/0562; H01M 10/0565; H01M 10/0585; H01M 2300/0091
(Continued)

(56) References Cited

U.S. PATENT DOCUMENTS

2015/0010804 A1* 1/2015 Laramie ............. H01M 50/446
429/144
2015/0255803 A1* 9/2015 Delnick ............. H01M 4/9041
429/498
(Continued)

FOREIGN PATENT DOCUMENTS

| DE | 102015111806 A1 | 1/2017 |
| JP | 2015176857 A | 10/2015 |
| KR | 1020160079405 A | 7/2016 |

OTHER PUBLICATIONS

JP Patent Application No. 2020-515198, Office Action dated Jun. 29, 2021.

*Primary Examiner* — James M Erwin
(74) *Attorney, Agent, or Firm* — Dickinson Wright PLLC

(57) ABSTRACT

The present invention relates to a curable composition for preparing a composite polymer electrode, the curable composition containing:
A) a Li-ion conducting solid electrolyte whose general composition has the formula:

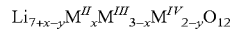

wherein
$M^{II}$, $M^{III}$, $M^{IV}$, $M^V$ are species of valence II to V; where $0 \leq x < 3$, preferably $0 \leq x \leq 2$; and $0 \leq y < 2$ preferably $0 \leq y \leq 1$;
(B) a polymer;
(C) a lithium salt;
(D) an active plasticizer; and
(E) a photoinitiator.

(Continued)

The invention also relates to a process of preparing the curable composition, cured compositions and films derived from the curable composition, and solid-state lithium batteries whose solid electrolyte layer contains a cured composition or a cured film according to the invention.

19 Claims, 7 Drawing Sheets

(51) Int. Cl.
  *H01M 10/0585* (2010.01)
  *H01M 10/0565* (2010.01)
  *H01M 10/0562* (2010.01)

(52) U.S. Cl.
  CPC ... *H01M 10/0565* (2013.01); *H01M 10/0585* (2013.01); *H01M 2300/0071* (2013.01); *H01M 2300/0082* (2013.01); *H01M 2300/0091* (2013.01)

(58) Field of Classification Search
  USPC .......................................................... 429/189
  See application file for complete search history.

(56) References Cited

U.S. PATENT DOCUMENTS

| | | | |
|---|---|---|---|
| 2016/0028114 A1* | 1/2016 | Pratt | H01M 4/621 429/309 |
| 2016/0093916 A1 | 3/2016 | Moon et al. | |
| 2016/0336618 A1 | 11/2016 | Lee et al. | |

* cited by examiner

COMPOSITE POLYMER ELECTROLYTE (CPE) MEMBRANES FOR SECONDARY SOLID STATE LI-METAL CELLS AND PROCESS FOR THE PRODUCTION THEREOF

RELATED APPLICATION

This application is a National Stage entry of PCT/EP2017/073163, filed Sep. 14, 2017, the entire disclosure of which is incorporated herein by reference.

FIELD OF THE INVENTION

The present invention relates to curable compositions for preparing composite polymer electrolyte (CPE) membranes, processes for preparing such compositions, films based on such curable compositions, and such compositions and films as cured by ultraviolet light (UV), notably to produce membranes for use in solid-state lithium batteries. Highly crosslinked polymer structures can be obtained in the composite polymer membranes, and they may enable solid-state lithium batteries to be obtained working at 20° C. at high current rate.

BACKGROUND ART

For all solid state Li metal cells, it is a problem to achieve long-term efficient cycling even at 20° C. at a high current rate (1 full charge in 1 hour). Reasons for these bad cycling performances may be: the low ionic conductivity of the solid electrolyte, difficulty of lithium cations to diffuse inside the solid electrolyte and high interfacial resistance between electrode and solid electrolyte. Also, even if long-term cycling is achieved, the capacity retention is very poor (less than 50% after 100 cycles).

The following Prior Art (PA) documents will be discussed below:
PA1: WO 2015/104727 A1
PA2: DE 10 2015 111806 A1
PA3: EP 2 648 265 A1
PA4: WO 2009/070600 A2
PA5: Porcarelli, L et al. (2016) SCIENTIFIC REPORTS, vol. 6, 19892-1.

PA1 (WO 2015/104727 A1) discloses a process for the production of a polymer electrolyte membrane, which comprises the successive steps of: preparing a mixed solution of a Room Temperature Ionic Liquid (RTIL), at least one alkaline metal salt and a photosensitive hydrogen abstracting component at a temperature in the range of 20 to 70° C.; adding to the solution a polymeric material at a temperature in the range of 20-70° C.; blending the solution added with the polymeric material at a temperature in the range of 70-140° C. to get a uniform mixture; pressing the mixture between two sheets at a temperature in the range of 60-150° C. and a pressure in the range of 20-80 bar, so that a film is formed; and exposing the film to UV light, so that the polymeric material of the film is cross-linked and the polymer electrolyte membrane is obtained. The performances obtained by Li-metal cells disclosed in PA1 are however not entirely satisfactory (not more than 100 cycles at 1C rate current at 25° C.). Further, the mandatory use of Room Temperature Ionic Liquids (RTILs) increases the cost of solid electrolyte/membrane (SPE).

PA2 (DE 10 2015 111806 A1) discloses a composite electrolyte comprising a lithium-ion-conducting glass ceramic, a polymer, an ionic liquid and a lithium salt. The lithium-ion-conducting glass ceramic may be a lithium compound with garnet structure. As mentioned above for PA1, the mandatory use of Room Temperature Ionic Liquids (RTILs) increases the cost. Further, the ionic conductivity of the membranes disclosed appears low.

PA3 (EP 2 648 265 A1) discloses a multi-layered structure electrolyte comprising a solid electrolyte and a gel polymer electrolyte provided on opposite surfaces of the ceramic solid electrolyte. Dropping of a liquid electrolyte such as lithium hexafluorophosphate salt (LiPF$_6$) dissolved in a carbonate blend (EC:EMC:DEC=3:2:5) is used to manufacture cells. The batteries of PA3 appear to show relatively low capacity.

PA4 (WO 2009/070600) discloses electrolyte separators including two phases, a first phase comprising poly(alkylene oxide) and an alkali-metal salt and a second phase comprising ionically conductive particles. Lithium aluminium titanium phosphate (LATP) is most preferred as ionically conductive particles.

PA5 (Porcarelli et al.) discloses polymer electrolytes obtained by UV-induced (co)polymerization, based on compositions containing polyethyleneoxide (PEO) plasticized by tetraglyme at various lithium salt concentrations. In this PA5, there is no step of distillation of the plasticizer.

The present invention seeks to provide a composite polymer electrolyte (CPE) able to provide one or more of the following advantages: long-term cycling (e.g. more than 300 cycles) of an all solid state Li-metal cell even at ambient temperatures; high capacity retention (e.g. at least 50% after 100 cycles) at high rate current (1 full charge in 1 h) even at ambient temperatures. Furthermore, composite polymer electrolyte (CPE) membranes may show one or more of the following additional advantages: (1) since a CPE membrane of the present invention can be prepared as a completely dry membrane, it is possible to stack cells into bipolar or monopolar configurations; (2) a CPE membrane of the present invention can work at room temperature so there is no need of a constant heating like in Bolloré cars (>50° C.); (3) a CPE membrane of the present invention may be safer because of the presence of less or no dendrite, and (4) safer because it is non-flammable.

The present invention also seeks to provide a process for preparing a composite polymer electrolyte (CPE) wherein the process requires neither volatile organic solvents nor Room Temperature Ionic Liquids (RTILs). Such a dry process may help to avoid surface contamination of the solid state electrolyte, and thus help to keep good interfacial properties (=no modification of Li conductivity). The present invention also seeks to provide a process for preparing a composite polymer electrolyte (CPE) with no need to apply high temperatures (100° C. or higher). Other advantages that the processes and/or products of the invention may provide include no leakage of flammable solvents with high vapour pressure, and/or shape/thickness retention at a large range of temperatures and/or under mechanical stress.

SUMMARY OF THE INVENTION

With a view notably to addressing one or more of the problems/issues in the art discussed above, the present invention relates, in one aspect thereof, to a curable composition for preparing a composite polymer electrolyte, the curable composition containing:

(A) a Li-ion conducting solid electrolyte whose general composition has the formula:

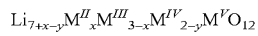

wherein
$M^{II}$ is at least one cation from the alkaline earth metal group or from the same group of the Periodic Table as $Zn^{2+}$,
$M^{III}$ is at least one cation chosen among $La^{3+}$, $Al^{3+}$, $Cr^{3+}$, $Ga^{3+}$, $Bi^{3+}$, $Y^{3+}$, $In^{3+}$ and/or $Fe^{3+}$,
$M^{IV}$ is at least one cation chosen among $Zr^{4+}$, $Ti^{4+}$, $Hf^{4+}$, $Sn^{4+}$ and/or $Si^{4+}$
$M^{V}$ is at least one cation chosen among $Nb^{5+}$, $Ta^{5+}$, $V^{5+}$ and/or $P^{5+}$;
where $0 \le x \le 3$, preferably $0 \le x \le 2$; and
$0 \le y < 2$ preferably $0 \le y \le 1$;
(B) a polymer;
(C) a lithium salt;
(D) an active plasticizer; and
(E) a photoinitiator.

The present invention further relates, in a different aspect thereof, to a process of preparing a composition according to the invention comprising the mixing of components (A) to (E), with optional grinding, at a temperature not exceeding 100° C.

It is preferred in processes of the present invention that no organic solvent be added to the mixture of components (A) to (E). It is further preferred that no Room Temperature Ionic Liquid (RTIL) be added to the mixture of components (A) to (E).

The present invention further relates, in a different aspect thereof, to a film having a composition as defined above for the curable composition of the invention. Such as film according to the invention may appropriately have a thickness of at least 0.5 μm and at most 500 μm, preferably at least 1.0 μm and at most 200 μm.

The present invention further relates, in a different aspect thereof, to a cured composition obtained by exposure of the curable composition of the invention to UV light.

The present invention further relates, in a different aspect thereof, to a cured film obtained by exposure to UV light of the film prepared using the curable composition of the invention.

The present invention further relates, in a different aspect thereof, to a solid-state lithium battery comprising the following elements:
a positive electrode active material layer;
a solid electrolyte layer;
a negative electrode active material layer,
wherein the solid electrolyte layer contains a cured composition or a cured film according to the invention, and the solid electrolyte layer is positioned between the positive electrode active material layer and negative electrode active material layer.

DETAILED DESCRIPTION OF THE INVENTION

Figure 1:
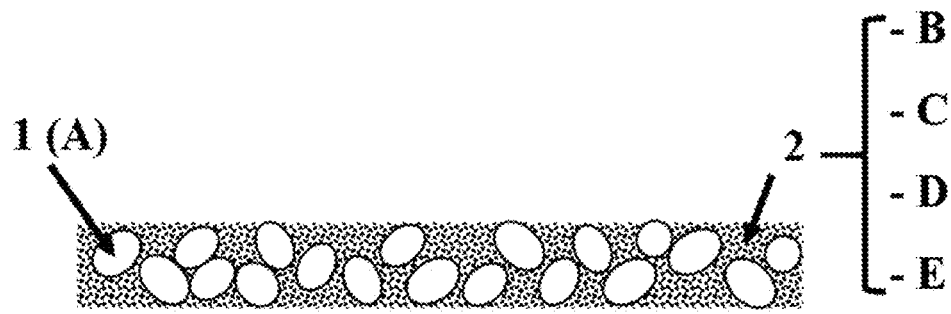
FIG. 1 shows an illustrative and non-limiting schematic representation of different parts of an exemplary composite polymer electrolyte (CPE) disclosed in the present invention. Here, element 1 is Li-ion conducting solid electrolyte (A), the numeral 2 designating the group of species consisting of: polymer (B), lithium salt (C), active plasticizer (D), photoinitiator (E).
Figure 2:
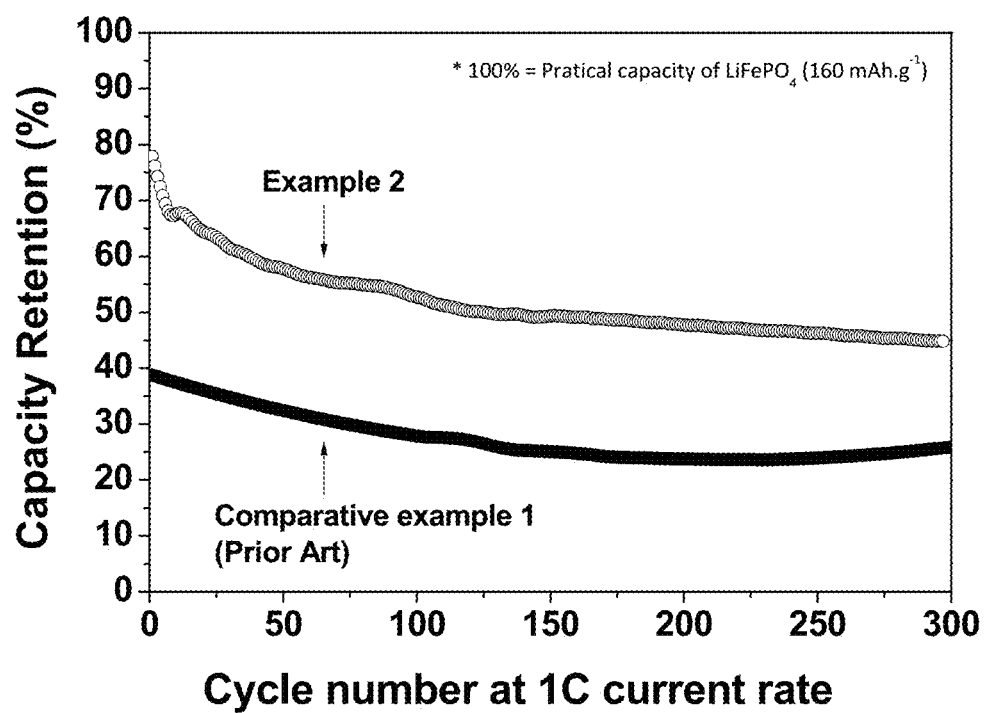
FIG. 2, based on experimental results shown in the present invention, enables visualisation of advantages provided by the invention such as higher capacity retention for a Li metal cell using $LiFePO_4$ as positive active material and lithium as negative electrode and CPE prepared using the process as described in FIG. 3a following option 2b of this process and using 40 wt % of garnet phase. The cell was cycled at a 1C rate (1 charge in 1 hour) at 20° C.

In the curable composition of the present invention, the Li-ion conducting solid electrolyte (A) is notably a material with garnet phase and notably a cubic garnet structure.

The Li-ion conducting solid electrolyte (A) used in the curable composition of the present invention preferably has an ionic conductivity of >0.5 mS cm$^{-1}$ at 25° C., and/or is present with an average particle size from 1 μm to 50 μm. The maximum particle size of sample may be fixed at, for example, 50 μm or 40 μm. In one embodiment of the present invention, the preferred maximum particle size of Li-ion conducting solid electrolyte (A) used is 32 μm.

In the curable composition of the present invention, the preferred amount of Li-ion conducting solid electrolyte (A), with respect to 100% by weight of the overall curable composition, is at least 5 wt % and at most 80 wt %, more preferably at least 20 wt % and at most 60 wt %, still more preferably at least 30 wt % and at most 50 wt %.

A particularly preferred Li-ion conducting solid electrolyte (A) to be used in the present invention is lithiumlanthanum-zirconate (LLZO). LLZO may show the chemical formula $Li_7La_3Zr_2O_{12}$. LLZO is advantageously used with the ionic conductivity, average particle size and weight percentage amounts indicated above for component (A) of the curable composition of the present invention.

Mixtures of garnets, for example mixtures of two or three distinct garnets, are envisaged for use as component (A) in the composition of the present invention.

In the curable composition of the present invention, the polymer (B) is advantageously a good dielectric material with an electronic conductivity, if the polymer (B) is taken in isolation, of less than $10^{-10}$ S·cm$^{-1}$.

Concerning the chemical nature of the polymer (B), in preferred embodiments, the polymer (B) shows repeating units containing heteroatoms such as nitrogen, oxygen or sulphur. Preferably also polymer (B) shows functional groups available for UV/thermally initiated radical polymerisation/cross-linking (e.g. double bonds, acidic protons).

A particularly preferred type of polymer (B) for use in the present invention is constituted by the group of polyethers/poly(alkylene oxides), for example poly(ethylene oxide) (PEO) and poly(propylene oxide) (PPO).

Other types of polymer (B) for use in the present invention include: polyacrylonitrile (PAN); polycarbonates (PC); polyesters and polylactones, for example polycaprolactone (PCL); poly(meth)acrylate esters, such as poly(methyl methacrylate) (PMMA).

Also envisaged for use as polymer (B) in the present invention are block copolymers of the above-mentioned polymer types e.g. PEO-PMMA or PEO-PMMA-PEO or PEO-PPO-PEO, PEO-PCL, etc.

Concerning the preferred molecular weight range for polymer (B) in the present invention, a preferred minimum average molecular weight is at least 500, more preferably $10^3$, still more preferably at least $10^4$. In principle, molecular weights of up to $10^7$ can be used, although in general $10^6$ is a suitable upper limit. Appropriate molecular weight ranges, for example for preferred poly(alkylene oxides) polymers such as poly(ethylene oxide) (PEO), may be in the range of 100 000 to 500 000, for example 200 000.

In the curable composition of the present invention, the preferred amount of polymer (B), with respect to 100% by weight of the overall curable composition, is at least 7 wt % and at most 40 wt %, more preferably at least 12 wt % and at most 35 wt %.

In the curable composition of the present invention, the lithium salt (C) is one or preferably one or more selected from the group consisting of: $LiPF_6$, $LiBF_4$, $LiClO_4$, LiFSI, LiTFSI, LiBOB $LiAsF_6$, LiFAP, LiTriflate, LiDMSI, LiHPSI, LiBETI, LiDFOB, LiBFMB, LiBison, LiDCTA, LiTDI, LiPDI. Examples of appropriate Li-ion salts are given for example in: Younesi et al., *Energy Environ. Sci.*, 2015, 8, 1905-1922.

In the curable composition of the present invention, the preferred amount of lithium salt (C), with respect to 100% by weight of the overall curable composition, is at least 1 wt % and at most 30 wt %, more preferably at least 5 wt % and at most 15 wt %.

In the curable composition of the present invention, the active plasticizer (D) is considered to be able to take part in the polymerization process that can decrease the viscosity of the final product.

In preferred embodiments, the active plasticizer has a boiling point of more than 120° C. Examples of active plasticizer are oligomeric polyethers with alkoxy, such as methoxy, end-capping groups e.g. glymes. Preferred active plasticizers (D) thus include: dimethoxytetraethylene glycol (TEGDME), diethylene glycol dimethyl ether (diglyme), triethylene glycol dimethyl ether (triglyme), poly(ethylene glycol) dimethyl ether (MW from 90 to 225 g·mol$^{-1}$).

Other possible active plasticizers (D) include low molecular weight oligomeric PCL, PC, polylactones, dialkyl sulfoxides, etc. It is envisaged that the active plasticizer (D) is able to donate hydrogen in cross-linking reactions.

Generally suitable molecular weights for the active plasticizers (D) are less than 500, preferably less than 400, more preferably less than 300, still more preferably less than 250 and most preferably less than or equal to 225.

In the present invention, it is preferred that the active plasticizer (D) has a water content below 10 ppm, and preferably below 5 ppm. This is for example achieved via a distillation process and/or via a drying step on molecular sieves and/or via a combination of both a distillation process and a drying step on molecular sieves to ensure the purity of the active plasticizer (D). The inventors consider that when there is still some water in the polymer membrane, the ionic conductivity may be higher. However, in order to avoid the formation of an interface layer on the surface of the Li-ion conducting solid electrolyte, it is preferable to have as much as possible dried materials.

In the curable composition of the present invention, the preferred amount of active plasticizer (D), with respect to 100% by weight of the overall curable composition, is at least 1 wt % and at most 50 wt %, more preferably at least 12 wt % and at most 35 wt %.

In the curable composition of the present invention, the photoinitiator (E) is considered to act as a light-induced hydrogen abstraction mediator able to give a cross-linking effect with the plasticizer and polymer chain. Preferred examples of photoinitiator are those having an aryl-CO— group, such as those having a benzophenone structure, for example 4-methylbenzophenone, benzophenone, chlorobenzophenone, or Darocur© (from BASF) and their blends. Generally useful photoinitiators are able to abstract hydrogen atoms (H). Fluorenones, xanthones, benzils, anthraquinones, terephthalophenones are other examples of possible photoinitiators in the present invention showing an aryl-CO— group, the aryl system being not necessarily an unsubstituted aryl (phenyl) ring, but potentially having substitution. Examples of carbonyl group-containing photoinitiators not having an aryl group adjacent to the CO group include alpha-ketocoumarins and terephthalophenones. Reference can be made here to the article of Allen, *Journal of Photochemistry and Photobiology A: Chemistry* 100 (1996) 101-107 Preferred photoinitiators (E) in the present invention are notably able to absorb light in the range 200-400 nm and belong to the class of free-radical photoinitiators, notably Type II photoinitiators.

In the curable composition of the present invention, the preferred amount of photoinitiator (E), with respect to 100% by weight of the overall curable composition, is at least 1 wt % and at most 12 wt %, more preferably at least 3 wt % and at most 7.5 wt %.

In the present invention, it is possible to add further additives to the curable composition, even if they are not essential components for the present invention. Such optional further additives may for example include one or more of:

(F): cellulose filler, rice grains, soy fibers, coconut fibers, starch grains, oyster shell, mussel shell, crustacean shell with a particle size from 10 nm to 100 µm;

(G): ceramic filler ($SiO_2$, $Al_2O_3$, MgO, $ZrO_2$, CaO, BaO, $La_2O_3$, $Bi_2O_3$, $Ga_2O_3$, $Cr_2O_3$, $Ta_2O_5$, $V_2O_5$, $P_2O_5$, $Mg_3Al_2Si_3O_{12}$, $Fe_3Al_2Si_3O_{12}$, $Ca_3Fe_2Si_3O_{12}$, $Ca_3Al_2Si_3O_{12}$, $Ca_3Cr_2Si_3O_{12}$), or sand grain, with a particle size from 10 nm to 100 µm;

(H): binding agents such as: polyvinylidene fluoride (PVdF), styrene-butadiene rubber (SBR), carboxymethyl cellulose (CMC), polytetrafluoroethylene (PTFE);

(I): optionally, some surfactants can be added along with some processing aids. Possible examples of classes of appropriate surfactant include non-ionic surfactants such as alkyl polyglycosides or poloxamers.

In the curable composition of the present invention, it is not necessary to incorporate a Room Temperature Ionic Liquid (RTIL). Typical RTILs are compounds having at least one organic cation associated with at least one organic or inorganic anion. The organic cation is commonly selected in the group consisting of imidazolium, ammonium, pyridinium, pyrrolidinium, piperidinium, phosphonium and sulfonium and is associated with an organic or inorganic anion. The preferred amount of Room Temperature Ionic Liquid (RTIL), with respect to 100% by weight of the overall curable composition of the present invention, is less than 10 wt %, more preferably less than 5 wt %, still more preferably less than 2 wt %, further more preferably less than 1 wt %, and in a preferable embodiment the curable composition of the present invention is substantially or completely free of Room Temperature Ionic Liquid (RTIL).

In an exemplary process for preparing a curable composition of the invention, the Li-ion conducting solid electrolyte (A) on the one hand, and the other components (B) to (E) on the other hand (and optional further components (F), (G), (H), (I) etc.) may advantageously be mixed in a non-obvious dried way in order to:

avoid the surface contamination of the Li-ion conducting solid electrolyte which may have a bad impact on Li-ionic conductivity;

obtain good mechanical properties for the composite polymer electrode (CPE) without temperature heating.

The process of mixing components (A) to (E) of the present invention allows one to avoid the use of both RTILs, as discussed above, and organic solvents. Organic solvents that may generally be used in conventional polymer electrolyte and electrode manufacture include: alcohols, ethers, ketones, carbonates, hydrocarbons, halogenated (e.g. chlorinated or fluorinated) hydrocarbons, sulfoxides, acetonitrile, (N-alkylated) amides, etc. Avoiding the use of organic solvents may show advantages such as reduced cost, increased safety, and reduced environmental burden. In preferred process embodiments of the invention, no organic solvent is added to the mixture of components (A) through to (E). Among components (A) through to (E), the active plasticizer (D) in particular may be a species, such a glyme, that is under more general circumstances in chemical technologies considered to have "organic solvent" properties. In this sense, a certain quantity of "organic solvent" may be considered to be present in the mixture of components (A) through to (E), but in preferred process embodiments according to the present invention, no further organic solvent is added beyond that which may be considered to be constituted by one or more of the components (A) through to (E) by themselves, and in particular the active plasticizer (D).

In an appropriate, solvent-free, process to obtain the CPE of the invention, the following steps may be performed (illustrated in an exemplary and non-limiting embodiment in FIG. 3a):

Step 1: In an dry box under inert atmosphere (for example, Ar filled with $O_2$<5 ppm, $H_2O$<1 ppm), for example using a beaker, lithium salt (C) and photoinitiator (E) are stirred with the active plasticizer (D).

Step 2: Li-ion conducting solid electrolyte (A), here illustrated as garnet phase A) is added under stirring following one of the following different options:

Option 2a: Component (A) (here, garnet phase (A)) is added as received;

Option 2b: Only component (A) (here, garnet phase (A)) below a certain particle size is added, for example the fraction sieved with 32 µm mesh;

Option 2c: Only the coarse fraction of garnet phase component (A) (here, garnet phase (A)) is added, for example the fraction sieved with 32 µm mesh; It is considered that it is possible (option 2a) to use the ceramic material as received, notably if the membrane thickness is allowed to be >200 µm, in particular for garnet contents up to 50% by weight. However, in some instances, when using option 2a, with several different particle sizes, the homogeneity of the preparation of polymer/ceramic phase is not optimal at the end of the process. For option 2c, using large particles, the volumetric proportion of ceramic compared to the polymer may be too high and may create some mechanical problems for the membrane after the UV curing. In a preferred process embodiment, option 2b is therefore used, i.e. a maximum particle size is fixed, by sieving as necessary.

Step 3: Polymer chain (B) is added under stirring.

Step 4 and step 5: The mixture is e.g. hand-ground in a mortar and heated, for example at 70-80° C. on a hot plate for 1 h. These steps may appropriately be repeated three times. At the end of these steps a homogeneous mixture is obtained.

Step 6: The mixture is placed between two sheets e.g. of Mylar (multiple layers of adhesive tape are used as spacers, thickness can be tuned between 80 and 250 µm, more preferably fixed at about 180 µm). Optionally this stack is sealed inside a polypropylene document bag.

Step 7: The sample is hot-pressed e.g. for 15 min with a pressure of e.g. 20 bar at temperature between 25° C. and 90° C. using a heat press machine. At the end of this step, a CPE with controlled thickness is obtained.

Step 8: The membrane is UV-cured, for example using UV light box with a power between 20 and 200 mW/cm$^2$ and for a duration of 1 min to 30 min. As a very specific illustrative example, one may use a UV light box for 6 minutes at 40 mW/cm$^2$. At the end of this step a cross-linked CPE is obtained.

Step 9: The CPE is carefully peeled (e.g. from the two Mylar foils), here in the glove box, in this illustrative embodiment.

Figure 7A:
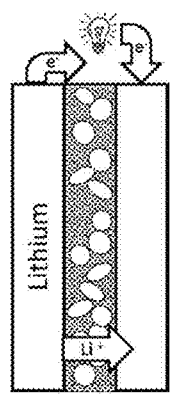
FIG. 7a shows schematically a lithium metal cell using CPE disclosed in the present invention during discharge stage.
Figure 7B:
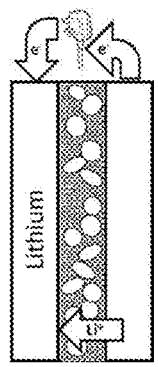
FIG. 7b shows schematically a lithium metal cell using CPE disclosed in the present invention during charge stage.

The CPE thus obtained is ready to be used as separating electrolyte in a Li metal cell (see FIG. 7).

<All Solid-State Lithium Battery>

In a further aspect, the present disclosure relates to an all-solid-state secondary lithium battery comprising the following elements:

a positive electrode active material layer;
a solid electrolyte layer;
a negative electrode active material layer, wherein the solid electrolyte layer contains a (cured) composite polymer electrolyte material produced according to the present invention, and is positioned between the positive electrode active material layer and negative electrode active material layer.

In a preferred embodiment, the negative electrode is Li metal. The Li metal may be in the form of Li foil or Li particles.

In such an all-solid-state lithium battery, using as solid electrolyte the (cured) composite polymer electrolyte material according to the present invention, as regards the thickness of a solid electrolyte layer, although this may change with the kind of solid electrolyte materials, and the overall composition of an all-solid battery, generally it is preferable that this thickness is within the range of 0.5 μm to 1000 μm, more preferably within the range of 30 μm to 200 μm, still more preferably 50 μm to 200 μm. The solid electrolyte layer will appropriately be thicker than the maximum particle size in the (A) Li-ion conducting solid electrolyte of the invention.

Concerning the positive active material (cathode active material) to be used in the positive electrode (cathode) active material layer, this is not especially limited if the average operating potential becomes more than 3 V (vs. Li$^+$/Li). As an average operating potential of positive active material, this is appropriately more than 3 V (vs. Li$^+$/Li), and it is preferable that it is within the limits of 2.0 V to 6.0 V, still more preferably within the limits of 3 V to 5 V. The average operating potential can be evaluated using cyclic voltammetry, for example. In particular, when cyclic voltammetry is measured at a small electric potential speed like 0.1 mV/sec, it can be considered that the average value of the voltage which gives the peak current on the side of oxidation, and the voltage which gives the peak current on the side of reduction is the average operating potential.

As a positive active material, especially if the average operating potential is made with more than 3 V (vs. Li$^+$/Li), there is no specific limitation, but it is preferable that the material is an oxide positive active material, which can have a high energy density.

A compound which has the spinel type structure denoted by general formula $LiM_2O_4$ (M is at least one kind of transition metal element), as an example of positive active material, can be mentioned as an example. As regards M of the above-mentioned general formula $LiM_2O_4$, especially if it is a transition metal element, it will not be limited, but it is preferable that it is at least one kind chosen from the group which consists of Ni, Mn, Cr, Co, V, and Ti, for example, and it is more preferable that it is at least one kind chosen from the group which consists of Ni, Mn, and Cr especially. Specifically, $LiCr_{0.05}Ni_{0.50}Mn_{1.45}O_4$, $LiCrMnO_4$, $LiNi_{0.5}Mn_{1.5}O_4$, etc. can be mentioned. The compound which has the olivine type structure denoted by general formula $LiMPO_4$ (M is at least one kind of transition metal element) as other examples of positive active material can be mentioned. M in the above-mentioned general formula will not be limited especially if it is a transition metal element, but it is preferable that it is at least one kind chosen from Fe, Mn, Co, Ni, and the group of the Periodic Table that consists of V, Nb, Ta, for example, and it is more preferable that it is at least one kind chosen from the group which consists of Fe, Mn, Co, and Ni especially. Specifically, $LiFePO_4$, $LiMnPO_4$, $LiCoPO_4$, $LiNiPO_4$, etc. can be mentioned. The compound which has the layer structure denoted by general formula $LiMO_2$ (M is at least 1 type of a transition metal element) as other examples of positive active material can be mentioned. Specifically, $LiCoO_2$, $LiNi_{0.5}Mn_{0.5}O_2$ and $LiNi_{0.33}Co_{0.33}Mn_{0.33}O_2$ etc. can be mentioned. As examples other than the positive active material mentioned above, a $Li_2MnO_3$—$LiN_{1/3}Co_{1/3}Mn_{1/3}O_2$ solid solution, a $Li_2MnO_3$—$LiNi_{0.5}Mn_{1/5}O_2$ solid solution, a $Li_2MnO_3$—$LiFeO_2$ solid solution, etc. can be mentioned.

As regards the form of the positive active material, a particle shape, such as the shape of a true ball and the shape of an elliptical ball, etc. can be mentioned, as an example. As for the mean particle diameter, when the positive active material has a particle shape, it is preferable that it is within the size range of 0.1 μm to 50 μm, for example, sometimes even in the nanometer range. As for the content of the positive active material in a positive active material layer, it is preferable that it is in the range of 10% by weight to 99% by weight, for example, more preferably from 20% by weight to 90% by weight.

Furthermore, a positive active material layer may contain an electrically conductive agent from a viewpoint of improving the conductivity of a positive active material layer. As electrically conductive material, acetylene black, Ketjen-black, a carbon fiber, carbon nanotube (CNT), carbon nano-fibers (CNF) etc. can be mentioned, for example. A positive active material may also contain a binding agent. As such a binding material (binding agent), fluorine-based binding materials, such as polyvinylidene fluoride (PVDF) and poly-tetrafluoroethylene (PTFE), etc. can be mentioned, for example. CMC, cellulose and similar biosourced binding agents can be used with water-based processes.

Although the thickness of a positive active material layer may change according to the kind of all-solid-state battery made, it is generally preferable that it is within the range of 0.1 μm to 500 μm.

In preferred embodiments for manufacturing all-solid-state lithium batteries according to the invention, the positive electrode is preferably dried before assembly. This drying process may also appropriately be applied for negative electrode too.

As regards the composition of the negative electrode active material layer, this layer at least contains one or more negative electrode active material(s), and may additionally contain at least one or more of solid electrolyte materials and electrically conductive agents if needed. For all-solid-state lithium batteries, the negative electrode active material is not limited provided that occlusion and discharge of the Li ion, which is a conduction ion, are possible. As a negative electrode active material, a carbon active material, a metal active material, etc. can be mentioned, for example. As a carbon active material, black lead, mesocarbon microbeads (MCMB), highly ordered/oriented pyrolytic graphite (HOPG), hard carbon, soft carbon, etc. can be mentioned as examples. On the other hand, as a metal active material, an alloy, such as Li alloy and Sn—Co—C, In, Al, Si, Sn, etc. can be mentioned as examples. Oxide stock materials, such as $Li_4Ti_5O_{12}$ or $TiO_2$, can be mentioned as examples of other negative electrode active materials.

In the present invention, the most preferred negative electrode active material is lithium metal (Li metal). Li metal may appropriately be used alone in the negative electrode notably because Li metal is at the same time an active material, electrical conductor and ionic conductor, such that there is no need to add other materials to obtain an electrode when using Li metal. The use of Li metal represents a huge improvement for volumetric and specific (gravimetric) energy density (Wh·l$^{-1}$ and Wh·kg$^{-1}$).

Concerning solid electrolyte materials used for the negative electrode active material layer, and an electrically conductive agent, these may be the same as that for the solid electrolyte layer and positive active material layer mentioned above.

The thickness of the negative electrode active material layer will generally be appropriately within the range of 0.1 μm to 500 μm.

An all-solid-state battery of the present disclosure has at least the positive active material layer, solid electrolyte layer, and negative electrode active material layer which were mentioned above. It further usually has a positive current collector which collects a positive active material layer, and a negative pole collector which performs current collection of a negative electrode active material layer. As a material of a positive current collector, for example, SUS (stainless steel), aluminum, nickel, iron, titanium, carbon, etc. can be mentioned, and SUS is especially preferable. On the other hand as a material of a negative pole collector, SUS, copper, nickel, carbon, etc. can be mentioned, for example, and SUS is especially preferable. Concerning the thickness, form, etc. of a positive pole collector and a negative pole collector, the person skilled in the art may choose suitably according to the use of the all-solid-state battery, etc. The cell case used for a common all-solid-state battery can be used, for example, the cell case made from SUS, etc. can be mentioned.

The all-solid-state battery of the present disclosure can be considered as a chargeable and dischargeable all-solid-state battery in a room temperature environment. Although it may be a primary battery and may be a rechargeable battery, it is especially preferable that it is a rechargeable battery. Concerning the form of the all-solid-state battery, a coin type, a laminated type, cylindrical, a square shape, etc. can be mentioned, as examples.

As regards the manufacturing method of the all-solid-state battery, this is not particularly limited, and common manufacturing methods of all-solid-state batteries can be used. For example, when an all-solid-state battery is in the thin film form, a positive active material layer can be formed on a substrate, and a method of forming a solid electrolyte layer and a negative electrode active material layer in order, and laminating them thereafter etc., may be used, but other process variants can be envisaged. For example, in the present invention, the (curable, as-yet uncured) curable composition (for preparing a composite polymer electrolyte) of the invention, can be directly polymerized (UV cured) in-situ on top of an electrode material film.

Figure 8A:
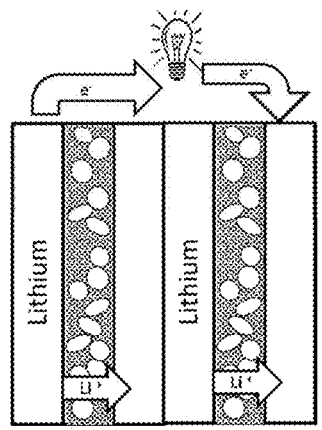
FIG. 8a shows schematically a lithium metal bipolar cell using CPE disclosed in the present invention during discharge stage.
Figure 8B:
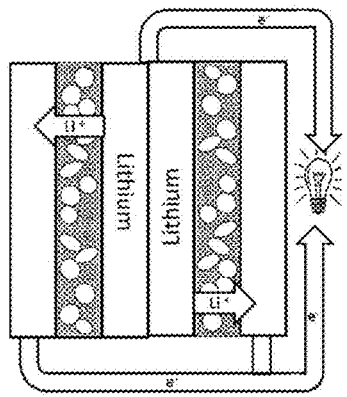
FIG. 8b shows schematically a lithium metal monopolar cell using CPE disclosed in the present invention during discharge stage.

The solid state lithium battery of the present invention may be assembled in a monopolar or bipolar configurations. A monopolar configuration (cf. FIG. 8a) is a way a have a stack of two or more (n) same simple cells (cf. FIGS. 7a and 7b). In this configuration a same current collector (metal foil) is shared between positive electrode of cell number n and positive electrode of cell number (n−1). In this way the stack cell, or monopolar configuration cell, has the same voltage as one cell but with n times the capacity of 1 simple cell. (this may be compared with a parallel configuration in electric circuit). A bipolar configuration (cf. FIG. 8b) is a way to have a stack of two or more (n) same simple cells (cf. FIGS. 7a and 7b). In this configuration a same current collector (metal foil) is shared between positive electrode of cell number n and negative electrode of cell number (n−1). In this way the stack cell, or bipolar configuration cell, has the same capacity as one cell but with n times the voltage of one simple cell.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

EXPERIMENTAL SECTION—EXAMPLES

The following experimental section illustrates experimentally the practice of the present invention, but the scope of the invention is not to be considered to be limited to the specific examples that follow.

Example 1

Figure 3A:
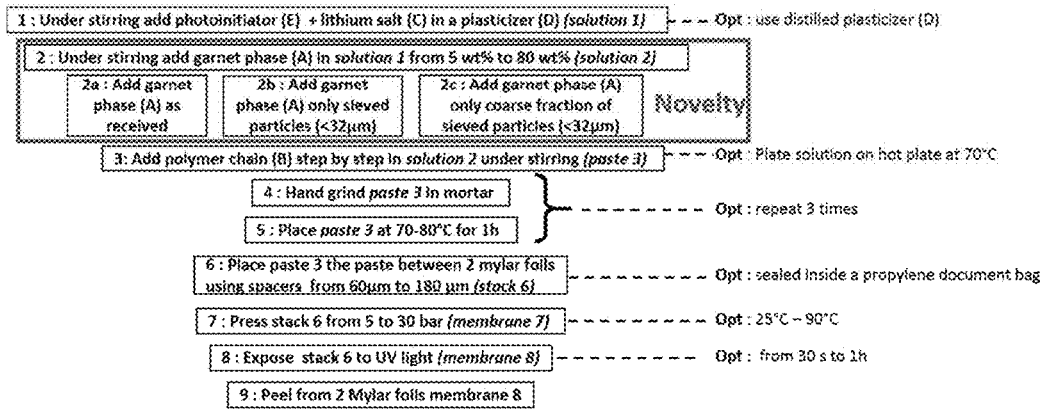
FIG. 3a shows schematically an illustrative and non-limiting process used to prepare a composite polymer electrolyte as disclosed in the present invention and illustrated in worked Examples 1 to 3.

This example shows the preparation of a solid composite polymer electrolyte (CPE) following option 2b of process described in FIG. 3a using 20 wt % of garnet phase.

In an Ar-filled dry box ($O_2$<5 ppm, $H_2O$<1 ppm), 120 mg of benzophenone was stirred with 620 mg of distilled tetraethylene glycol dimethylether. 240 mg of bis(trifluoromethane)sulfonimide lithium salt (LiTFSI) was added in the stirred solution. Then 400 mg of garnet cubic LLZO purchased from Schott and sieved with 32 μm mesh was added under stirring. Then, 620 mg of poly(ethylene oxide) (PEO) was added step by step in the solution under stirring. Then, the mixture was hand-ground in an agate mortar and heated at 70-80° C. on a hot plate for 1 hour. After repeating the previous operation, the sample was placed between two Mylar sheets (multiple layers of adhesive tape were used as spacers, resulting in a thickness of ≈180 μm) and sealed inside a polypropylene bag. The sample was hot-pressed at 70° C. for 15 minutes with pressure of 20 bar using heat press machine placed in a dry room (10 $m^2$, average R.H.≈2% at 20° C.). Then, the CPE was UV-cured for 6 minutes at 40 mW·$cm^{-2}$. The CPE was carefully peeled from the two Mylar foils in glove box to be used in a lab-scale lithium cell.

<Preparation of Positive Electrode for Example 1>

The cathodes were prepared by standard procedure from a slurry based on N-methyl pyrrolidone containing $LiFePO_4$ (from Clariant-LP2: Life Power® P2, particle size 100-300 nm, prepared by a wet process, not carbon-coated) as active material, carbon black and PVdF in 70:20:10 weight ratio, respectively. The slurry was deposited onto an Al foil and later dried overnight (120° C.).

<Manufacture of Cell for Example 1>

Cells were assembled by sandwiching cathode (Ø=16 mm), SPE (Ø=16 mm) and Li metal foil (Ø=14 mm) in an ECC-Std test cell (EL-Cell, Germany) in an Ar filled glove box. Before testing, cells were placed at 70° C. overnight.

<Evaluation of Cell for Example 1>

The cells were tested with an ARBIN BT2000 battery tester with galvanostatic test between 2.7 V vs. $Li^+$/Li and 4 V vs. $Li^+$/Li. Capacity obtained at ambient temperature for 1C current rate of this cell after 100 cycles is shown in Table 1 below.

Example 2

This example shows the preparation of a solid composite polymer electrolyte (CPE) following option 2b of process of process described in FIG. 3a using 40 wt % of garnet phase.

In an Ar-filled dry box ($O_2$<5 ppm, $H_2O$<1 ppm), 90 mg of benzophenone was stirred with 465 mg of distilled tetraethylene glycol dimethylether. 180 mg of bis(trifluoromethane)sulfonimide lithium salt (LiTFSI) was added in the stirred solution. Then 800 mg of garnet cubic LLZO purchased from Schott and sieved with 32 μm mesh was added under stirring. Then, 465 mg of poly(ethylene oxide) (PEO) was added step by step in the solution under stirring. Then, the mixture was hand-ground in an agate mortar and heated at 70-80° C. on a hot plate for 1 h. After repeating the previous operation, the sample was placed between two Mylar sheets (multiple layers of adhesive tape were used as spacers, resulting in a thickness of ≈180 μm) and sealed inside a polypropylene bag. The sample was hot-pressed at 70° C. for 15 min with pressure of 20 bar using heat press machine placed in a dry room (10 m², average R.H.≈2% at 20° C.). Then, the CPE was UV-cured for 6 minutes at 40 mW·cm⁻². The CPE was carefully peeled from the two Mylar foils in glove box to be used in battery cell.

<Preparation of Positive Electrode for Example 2>

The same preparation as the one reported for Example 1 was applied for Example 2.

<Manufacture of Cell for Example 2>

The same manufacture method for a cell as the one reported for Example 1 was applied for Example 2.

<Evaluation of Cell for Example 2>

Figure 4:
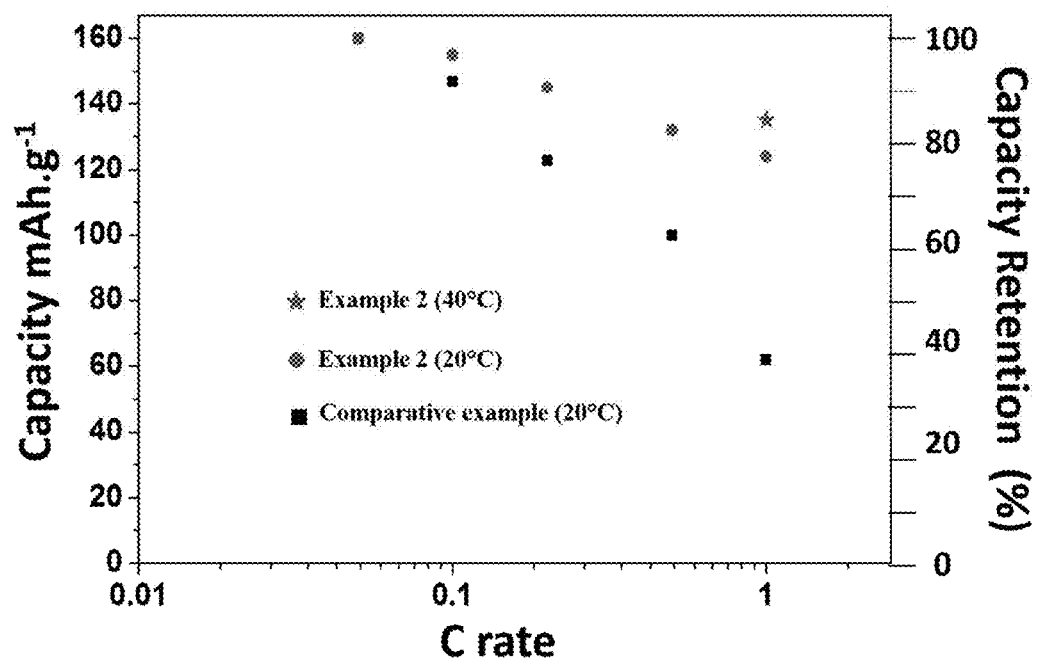
FIG. 4 shows an experimental comparison of capacity obtained after a 1$^{st}$ cycle for a Li metal cell using $LiFePO_4$ as positive active material, lithium as negative electrode and a composite polymer electrolyte (CPE) prepared using a process as described in FIG. 3a following option 2b of this process and using 40 wt % of garnet phase and solid polymer electrolyte (SPE) prepared using process as described in FIG. 3b.
Figure 5A:
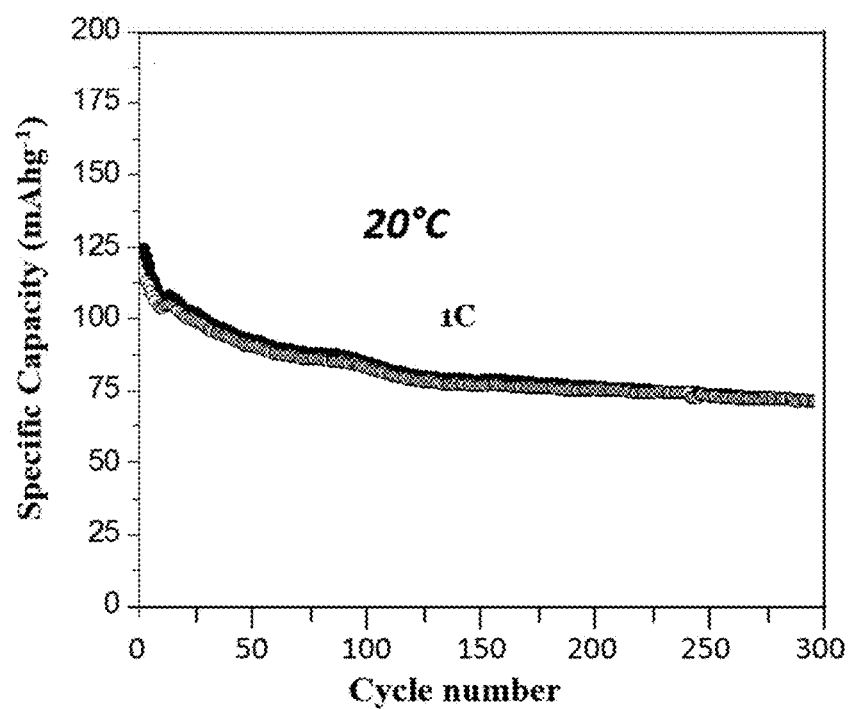
FIG. 5a shows an experimental comparison of performances for a Li metal cell using $LiFePO_4$ as positive active material and lithium as negative electrode and CPE prepared using process as described in FIG. 3a following option 2b of this process and using 40 wt % of garnet phase. The cell was cycled at a 1C rate (1 charge in 1 hour) at 20° C.
Figure 5B:
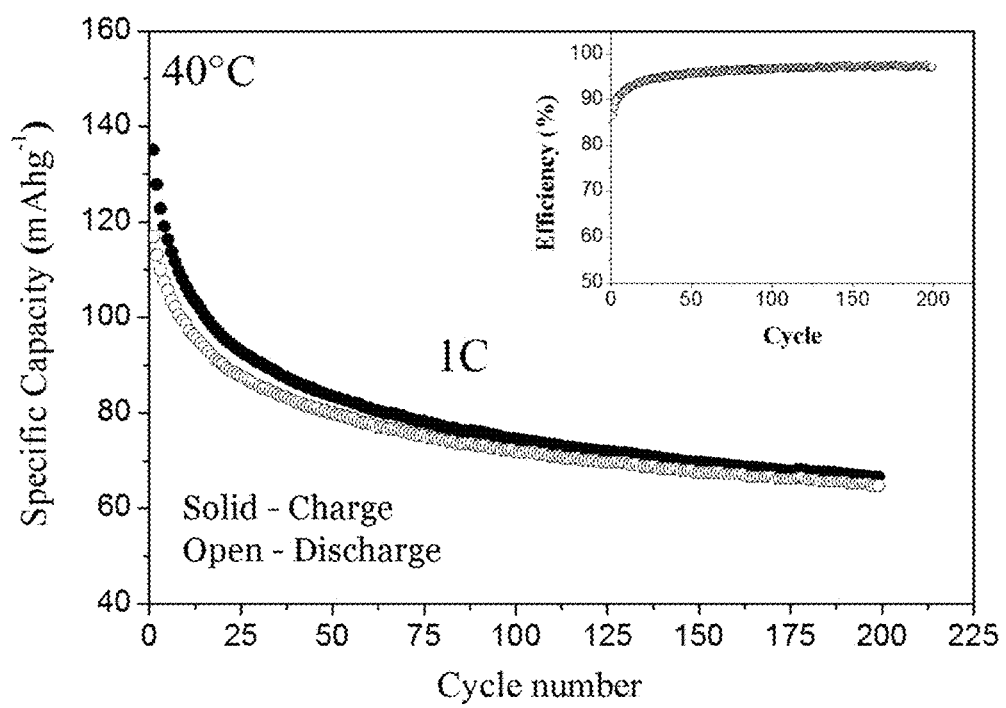
FIG. 5b shows an experimental comparison of performances for a Li metal cell using $LiFePO_4$ as positive active material and lithium as negative electrode and CPE prepared using process as described in FIG. 3a following option 2b of this process and using 40 wt % of garnet phase. The cell was cycled at a 1C rate (1 charge in 1 hour) at 40° C.
Figure 6:
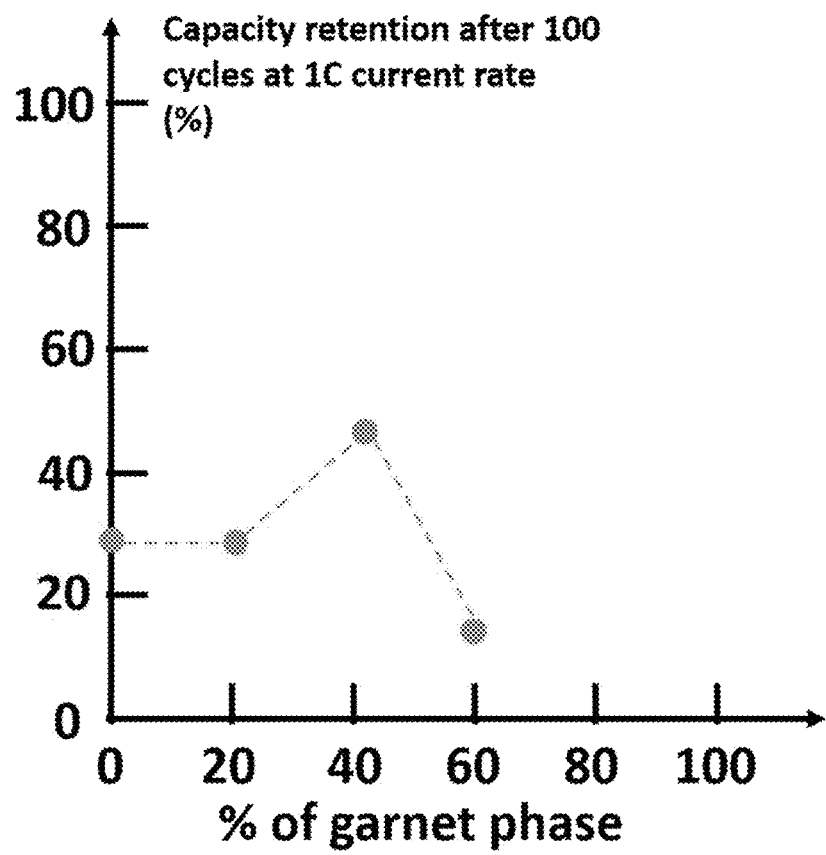
FIG. 6 illustrates in a non-limiting way a study of capacity retention after 100 cycles at a 1C current rate at ambient temperature with respect to the weight ratio of cubic garnet phase.

The cells were tested with an ARBIN BT2000 battery tester with galvanostatic test between 2.7 V vs. Li⁺/Li and 4 V vs. Li⁺/Li. Capacities obtained after the 1$^{st}$ cycle at room temperature and 40° C. for different current rates are presented on FIG. 4 and compared with prior art (Comparative Example 1). Capacity obtained at room temperature for a 1 C current rate of this cell is shown in FIG. 5a. Capacity obtained at 40° C. for a 1 C current rate of this cell is shown in FIG. 5b.

Example 3

This example shows the preparation of a solid composite polymer electrolyte (CPE) following option 2b of process of process described in FIG. 3a using 60 wt % of garnet phase.

In an Ar-filled dry box (O₂<5 ppm, H₂O<1 ppm), 60 mg of benzophenone was stirred with 310 mg of distilled tetraethylene glycol dimethylether. 120 mg of bis(trifluoromethane)sulfonimide lithium salt (LiTFSI) was added in the stirred solution. Then 1200 mg of Garnet cubic LLZO purchased from Schott and sieved with 32 μm mesh was added under stirring. Then, 310 mg of poly(ethylene oxide) (PEO) was added step by step in the solution under stirring. Then, the mixture was hand-ground in an agate mortar and heated at 70-80° C. on a hot plate for 1 h. After repeating the previous operation, the sample was placed between two Mylar sheets (multiple layers of adhesive tape were used as spacers, resulting in a thickness of ≈180 μm) and sealed inside a polypropylene bag. The sample was hot-pressed at 70° C. for 15 minutes with pressure of 20 bar using heat press machine placed in a dry room (10 m², average R.H.≈2% at 20° C.). Then, the CPE was UV-cured for 6 minutes at 40 mW·cm⁻². The CPE was carefully peeled from the two Mylar foils in glove box to be used in battery cell.

<Preparation of Positive Electrode for Example 3>

The same preparation as the one reported for Example 1 was applied for Example 3.

<Manufacture of Cell for Example 3>

The same method of manufacture of a cell as the one reported for Example 1 was applied for Example 3.

<Evaluation of Cell for Example 3>

The cells were tested with an ARBIN BT2000 battery tester with galvanostatic test between 2.7 V vs. Li⁺/Li and 4 V vs. Li⁺/Li Comparative Example 1

Figure 3B:
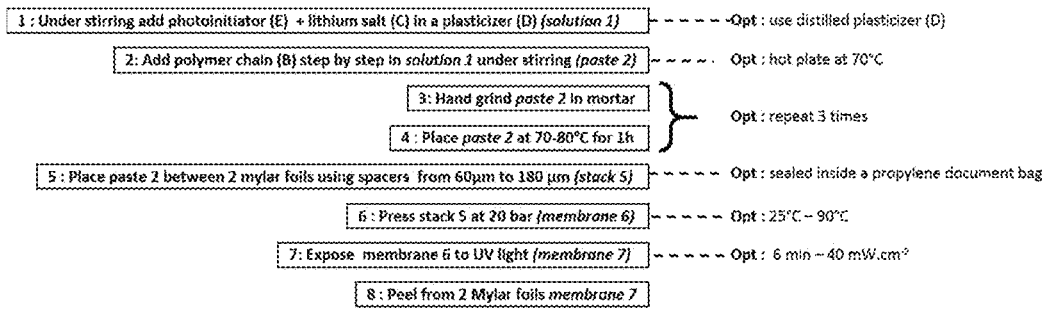
FIG. 3b represents schematically a process used to make a polymer electrolyte as disclosed in PA5 (Porcarelli et al.) and in Comparative Example 1 of the present disclosure. It is to be note however that for present Comparative Example 1 the plasticizer is well dried, which is not the case in PA5.

This comparative example shows the preparation of a solid polymer electrolyte (SPE) (c.f. FIG. 3b).

In an Ar-filled dry box (O₂<5 ppm, H₂O<1 ppm), 150 mg of benzophenone was stirred with 775 mg of distilled tetraethylene glycol dimethylether. 300 mg of bis(trifluoromethane)sulfonimide lithium salt (LiTFSI) was added in the stirred solution. Then, 775 mg of poly(ethylene oxide) (PEO) was added step by step in the solution under stirring. Then, the mixture was hand-ground in an agate mortar and heated at 70-80° C. on a hot plate for 1 h. After repeating the previous operation, the sample was placed between two Mylar sheets (multiple layers of adhesive tape were used as spacers, resulting in a thickness of ≈180 μm) and sealed inside a polypropylene document bag. The sample was hot-pressed at 50° C. for 15 min with pressure of 20 bar using heat press machine placed in a dry room (10 m², average R.H.≈2% at 20° C.). Then, the SPE was UV-cured for 6 minutes at 40 mW/cm². The SPE was carefully peeled from the two Mylar foils in glove box to be used in a battery cell.

<Preparation of Positive Electrode for Comparative Example 1>

The cathodes were prepared by standard procedure from a slurry based on N-methyl pyrrolidone containing LiFePO₄ (from Clariant-LP2) as active material, carbon black and PVdF in 70:20:10 weight ratio, respectively. The slurry was deposited onto an Al foil and later dried overnight (120° C.).

<Manufacture of Cell for Comparative Example 1>

Cells were assembled by sandwiching cathode (Ø=16 mm), SPE (Ø=16 mm) and Li metal foil (Ø=14 mm) in a ECC-Std test cell (EL-Cell, Germany) in an Ar filled glove box. Before testing, cells was placed at 70° C. overnight.

<Evaluation of Cell for Comparative Example 1>

The cells were tested according to the same protocol as in Example 1 above.

TABLE 1

Composite polymer electrolyte performance and cycling performance

| | Example 1 | Example 2 | Example 3 | Comparative Example 1 |
|---|---|---|---|---|
| A: LLZO wt % | 20 | 40 | 60 | 0 |
| B: PEO wt % | 31 | 23.25 | 15.5 | 38.75 |
| C: LiTFSI wt % | 12 | 9 | 6 | 15 |
| D: TEGDME wt % | 31 | 23.25 | 15.5 | 38.75 |
| E: benzophenone wt % | 6 | 4.5 | 3 | 7.5 |
| Cycles | >300 | >300 | >300 | <100 |
| Charge capacity after 100 cycles at 1 C (mAhg⁻¹) | 42 | 84 | 27 | 45 |
| Capacity retention after 100 cycles | 27% | 50% | N.A. | 28% |

Using CPE membranes of the present invention, it is considered that cycling at 20° C. is possible or even at lower temperatures (0° C. for instance), so that use of batteries of the invention over a wide temperature range of operation can be envisaged, from subambient temperature to high temperature. At high temperatures, cycling at temperatures of up to 120° C. can be envisaged, for example in a range of 80-120° C.

The invention claimed is:

1. A curable composition for preparing a composite polymer electrolyte, the curable composition containing:
 (A) a Li-ion conducting solid electrolyte;
 (B) a polymer;
 (C) a lithium salt;
 (D) an active plasticizer; and
 (E) a photoinitiator;
 wherein the Li-ion conducting solid electrolyte (A) is lithium-lanthanum-zirconate (LLZO),
 wherein the polymer (B) has a polymer chain of the type: polyether, polyacrylonitrile, polycarbonate, polyester, polylactone, poly(meth)acrylate ester; or polymer (B) is a block copolymer containing two or more of such polymer chain types as component blocks in polymer chains; or polymer (B) is a physical blend of two or more of such polymer chain types, and wherein the active plasticizer (D) is one or more selected from the group consisting of: dimethoxytetraethylene glycol (TEGDME), diethylene glycol dimethyl ether, triethylene glycol dimethyl ether, poly(ethylene glycol) dimethyl ether, and wherein the active plasticizer (D) has a water content below 10 ppm, and/or is obtained via a distillation process and/or via a drying step on molecular sieves and/or via a combination of both a distillation process and a drying step on molecular sieves to ensure its purity.

2. The curable composition according to claim 1, wherein the polymer (B) is poly(ethylene oxide) (PEO) and/or poly (propylene oxide) (PPO).

3. The curable composition according to claim 1, wherein the Li-ion salt (C) is one or more selected from the group consisting of: $LiPF_6$, $LiBF_4$, $LiClO_4$, LiFSI, LiTFSI, LiBOB, $LiAsF_6$, LiFAP, LiTriflate, LiDMSI, LiHPSI, LiBETI, LiDFOB, LiBFMB, LiBison, LiDCTA, LiTDI, LiPDI.

4. The curable composition according to claim 1, wherein the active plasticizer (D) has a water content below 5 ppm, and/or is obtained via a distillation process and/or via a drying step on molecular sieves and/or via a combination of both a distillation process and a drying step on molecular sieves to ensure its purity.

5. The curable composition according to claim 1, wherein the photoinitiator (E) has an aryl-CO— group, and is selected from the group consisting of 4-methylbenzophenone, benzophenone, chlorobenzophenone, fluorenones, xanthones, benzils, anthraquinones, terephthalophenones, an alpha-ketocoumarin, and a terephthalophenone.

6. The process of preparing a composition according to claim 1 comprising the mixing of components (A) to (E) at a temperature not exceeding 100° C.

7. The process of preparing a composition according to claim 1 comprising the mixing of components (A) to (E), with grinding, at a temperature not exceeding 100° C.

8. The process according to claim 6, carried out a temperature not exceeding 90° C.

9. The process according to claim 6, carried out a temperature not exceeding 80° C.

10. The process according to claim 6, wherein no organic solvent is added to the mixture of components (A) to (E).

11. The process according to claim 6 wherein no Room Temperature Ionic Liquid (RTIL) is added to the mixture of components (A) to (E).

12. A film having a composition according to claim 1.

13. A film according to claim 12 having a thickness of at least 0.5 μm and at most 500 μm.

14. A film according to claim 12 having a thickness of at least 1.0 μm and at most 200 μm.

15. A cured composition obtained by exposure of the curable composition according to claim 1.

16. A cured film obtained by exposure to UV light of the film according to claim 12.

17. A solid-state lithium battery comprising the following elements:
a positive electrode active material layer;
a solid electrolyte layer;
a negative electrode active material layer,
wherein the solid electrolyte layer contains a cured composition according to claim 15, and the solid electrolyte layer is positioned between the positive electrode active material layer and negative electrode active material layer.

18. A solid-state lithium battery comprising the following elements:
a positive electrode active material layer;
a solid electrolyte layer;
a negative electrode active material layer,
wherein the solid electrolyte layer contains a cured composition according to claim 16, and the solid electrolyte layer is positioned between the positive electrode active material layer and negative electrode active material layer.

19. The solid state lithium battery according to claim 17, which is assembled in a monopolar or a bipolar configuration.

* * * * *